United States Patent
Schweizer et al.

(10) Patent No.: US 8,028,519 B2
(45) Date of Patent: Oct. 4, 2011

(54) METHOD AND DEVICE FOR REGENERATING AN EMISSION CONTROL SYSTEM

(75) Inventors: Frank Schweizer, Shwaikheim (DE); Stefan Scherer, Stuttgart (DE); Gerd Hartmann, Weingarten (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 12/158,899

(22) PCT Filed: Dec. 13, 2006

(86) PCT No.: PCT/EP2006/069681
§ 371 (c)(1),
(2), (4) Date: Oct. 8, 2008

(87) PCT Pub. No.: WO2007/074071
PCT Pub. Date: Jul. 5, 2007

(65) Prior Publication Data
US 2009/0094962 A1    Apr. 16, 2009

(30) Foreign Application Priority Data
Dec. 23, 2005 (DE) .......................... 10 2005 061 872

(51) Int. Cl.
*F01N 3/10* (2006.01)
(52) U.S. Cl. ........................................... 60/295; 60/301
(58) Field of Classification Search .................... 60/286, 60/285, 295, 301
See application file for complete search history.

(56) References Cited

U.S. PATENT DOCUMENTS

| 5,090,199 A * | 2/1992 | Ikuta et al. ...................... 60/276 |
| 5,775,099 A | 7/1998 | Ito et al. |
| 2004/0154285 A1* | 8/2004 | Nagaoka et al. ............... 60/285 |

FOREIGN PATENT DOCUMENTS

| DE | 197 39 848 | 3/1999 |
| DE | 19739848 | 3/1999 |
| DE | 100 23 079 | 1/2002 |
| EP | 0 903 479 | 3/1999 |
| GB | 2 410 203 | 7/2005 |
| JP | 1003214228 | 7/2003 |
| JP | 2003214228 | 7/2003 |
| WO | WO 2007/074071 A1 | 7/2007 |

* cited by examiner

*Primary Examiner* — Thomas Denion
*Assistant Examiner* — Jonathan Matthias
(74) *Attorney, Agent, or Firm* — Merchant & Gould P.C.

(57) ABSTRACT

The invention relates to a method for regenerating an emission control system of an internal combustion engine, comprising a storage catalytic converter, a first exhaust gas probe being situated in an exhaust gas tract upstream of the storage catalytic converter and a second exhaust gas probe being situated in a second exhaust gas tract downstream of the storage catalytic converter. A first output signal of a first exhaust gas probe and a second output signal of a second exhaust gas probe are supplied to an engine management system and the storage catalytic converter is regenerated by being exposed to a reductant in a regeneration phase. If the quantity of reductant is controlled by the engine management system during the regeneration phase, whereby said system detects the quantity of reductant that is present downstream of the storage catalytic converter by means of the second output signal of the second exhaust gas probe situated downstream of said converter, the charging of reductant can be significantly reduced with respect to an optimised dosage. Excess consumption of fuel or reductant as a result of the regeneration of the storage catalytic converter is minimised. In addition, the method improves the emission values, thus significantly contributing to the maintenance of emission limits.

8 Claims, 2 Drawing Sheets

METHOD AND DEVICE FOR REGENERATING AN EMISSION CONTROL SYSTEM

TECHNICAL FIELD

The invention is based on a method for regenerating an emission control system of a combustion engine with a storage catalyst, whereby a first exhaust gas probe is arranged in a first exhaust gas system before the storage catalyst and a second exhaust gas probe in a second exhaust gas system after the storage catalyst, whereby a first output signal of a first exhaust gas probe and a second output signal of a second exhaust gas probe are forwarded to an engine control unit and whereby the storage catalyst is regenerated by an admission flow with a reduction agent in a regeneration phase.

The invention is furthermore based on a device for operating this emission control system.

BACKGROUND

Related to future statutory provisions regarding the nitric oxide emission of motor vehicles, an adequate exhaust gas treatment is required. In order to store the arising nitric oxides a nitric oxide storage catalyst can be used. The storage catalyst can only store a limited amount of nitric oxides and has to be regenerated when the maximum storage capacity is reached at the latest. A procedure for regenerating is based on the introduction of an over-stoichiometric fuel-air-mixture, which is enriched with fuel, for a specific period of time into the combustion engine, and on the addition of the developed "rich" exhaust gas over the storage catalyst. The carbon monoxide, which is contained in the rich exhaust gas, and the hydrocarbons, which are also contained, are oxidized by the nitric oxides, that are present in the storage catalyst, into carbon dioxide and water. The emerging nitrogen is brought away with the exhaust gas. The end of the regeneration is typically thereby determined, that rich exhaust gas leaves the storage catalyst without reacting. This is detected by the linear or binary signal.

Alternatively to the controlling of the fuel-air-mixture in the direction of a higher fuel concentration, the regeneration can also take place by a direct addition of a reduction agent into the exhaust gas system.

Due to DE 197 39 848 A1 a possibility is known, to determine the end of the phase with rich exhaust gas. Therefore a probe is arranged in the exhaust gas after the storage catalyst, which measures oxygen. As soon as the probe notices a transfer from a lean to a rich mixture, this means, that the storage catalyst does not provide sufficient oxygen for the oxidization of the hydrocarbons and the carbon monoxides and that it is discharged from nitric oxides, which contain oxygen. As a result the phase can be terminated with oxygen deficiency and be redirected back to the phase with a lean mixture (oxygen surplus). Since the transfer from lean exhaust gas to rich exhaust gas takes place after the storage catalyst, a breakthrough of carbon monoxide and hydrocarbons has to be accepted at the termination of the regeneration phase, in order to completely empty the catalyst from stored nitric oxides. Undesired carbon monoxide- and hydrocarbon-emissions occur, which can cause problems with the abidance of the contaminant marginal values. Furthermore the fuel consumption is raised over the needed dose by the extension of the regeneration phases.

Also from U.S. Pat. No. 5,775,099 a procedure for the exhaust gas purification of a combustion engine becomes known. The exhaust gases of the combustion engine are added through the storage catalyst. At a lean air-fuel-relation the exhaust gas shows a high nitric oxide concentration, which is stored in the storage catalyst. At a stoichiometric or rich air-fuel-relation the nitric oxide from the storage catalyst is reduced to nitrogen. For this purpose U.S. Pat. No. 5,775,099 suggests to increase the fuel amount, so that a stoichiometric or rich air-fuel-relation results. Thereby fuel is injected at the end of the compression stroke in such a quantity, that a lean middle air-fuel-mixture evolves, and additionally fuel is injected during the intake stroke, so that a stoichiometric or rich air-fuel-relation evolves. The exhaust gas, that has developed thereby, delivers the needed components for the regeneration of the storage catalyst.

A disadvantage of the described methods is that a part of the reduction agent, which is contained in the rich exhaust gas, already leaves the storage catalyst, before it is completely regenerated. This conversion rate of the storage catalyst depends highly on the temperature of the storage catalyst's surface, the exhaust gas volume flow, the filling size and the ageing of the storage material. The dosage of the reduction agent has to be aligned with the mentioned influencing factors.

It is the invention's task to provide a method for regenerating an emission control system, which doses the reduction agent so, that no unneeded excess consumption takes place and therefore the environment is not unnecessarily burdened.

The invention's further task is to provide a corresponding device.

SUMMARY

The invention's task is thereby solved, in that the amount of reduction agent is controlled during the regeneration phase of the storage catalyst by the engine control unit, whereby the engine control unit acquires the amount of the reduction agent, which appears after the storage catalyst, with a second output signal of the second exhaust gas probe, which is arranged after the storage catalyst. Thereby the use of reduction agent, with regard to an optimal dosage, can be clearly reduced. An excess consumption of fuel or reduction agent, that is conditional on the regeneration of the storage catalyst, is minimized. According to the invention the storage catalyst is added every moment with as much reduction agent, as it can convert. Furthermore the exhaust gas values are improved, which means a substantial contribution to the abidance of the exhaust gas marginal values.

A preferred variation of the method provides that the addition of reduction agent takes place until the second output signal of the second exhaust gas probe meets almost the same lambda value like the first output signal of the first exhaust gas probe. Thereby it is responded simultaneously on the impairment or ageing of the storage catalyst during the increasing operating period of the combustion engine, without a pre-controlling, which has to calculate the influences in the controller, being necessary. Since the thermal impairment of the storage catalyst can only estimate the service life very broadly and only predict the actual of the reduction agent breakthrough very imprecisely, this is especially relevant. Such a regulation allows the abidance of the strict exhaust gas legislation especially in exhaust gas measure cycles with a low engine load and therefore a low temperature of the storage catalyst.

If the second output signal of the second exhaust gas probe is used as a disturbance variable for the lambda nominal value, it can be achieved that the dosage of the reduction agent can be diminished at a decrease of the conversion rate of the storage catalyst, and thereby the reduction agent or fuel, if rich exhaust gas is used for the reduction, can be saved.

In a preferred implementation model a correction signal is established out of the difference between a lambda value of "one" and the second output signal of the second exhaust gas probe and the correction signal is added to the lambda nominal value in order to establish a corrected lambda nominal value. Thereby a breakthrough of reduction agent is suppressed during the regeneration.

One preferred implementation model provides that a correction of the lambda nominal value is only undertaken during a regeneration phase. Thereby it is guaranteed that the correction only intervenes in the regeneration phase, but not in the remaining driving operation.

Furthermore the correction of the lambda nominal value is only undertaken, if thereby the lambda nominal value is corrected in the direction of higher lambda values from a lambda value of "one". Thereby it is prevented that a previously undertake correction is taken back again. A previously occurred decrease of the conversion rate of the storage catalyst does not diminish again without outside influences, so that this type of correction of the lambda nominal value considers the physical backgrounds correctly. Corrections are only undertaken if the lambda value before the storage catalyst is "regulated" and thereby deviates from the lambda value by less than a preset limit.

A further preferred implementation model provides that the regeneration phase is terminated at a preset level of the correction value or of the filtered correction value. The correction value is a dimension for the decrease of the conversion rate of the storage catalyst, which diminishes when the storage catalyst is regenerated. Therefore a level can be designated for the correction signal, from which the storage catalyst can be regarded as regenerated. Thereby the regeneration time as well as the use of reduction agent can be minimized.

The device's task is thereby solved, in that the first exhaust gas probe, that is upstream before the storage catalyst, is linear, and in that the second exhaust gas probe, that is downstream after the storage catalyst, is linear or equipped with snap-action characteristics. At the transfer from a lean to a rich mixture, linear exhaust gas probes show interim values und are therefore particularly suitable for the invented method. Exhaust gas probes with snap-action characteristics are on the other hand extremely cost-effective.

The second exhaust gas probe is also used in newer combustion engines within the scope of the "On Board Diagnose", in order to monitor the functioning of the storage catalyst. If the second exhaust gas probe is a linear one, the engine control unit can compare the first output signal of the first exhaust gas probe before the storage catalyst with the second output signal of the second exhaust gas probe after the storage catalyst.

If the engine control unit is provided for the implementation of the invention, a conservation of reduction agent or fuel can be achieved with minor additional expenses in the control without additional features.

BRIEF DESCRIPTION OF THE DRAWINGS

The invention is further illustrated with the implementation models shown in the following figures.

DETAILED DESCRIPTION

Figure 1:
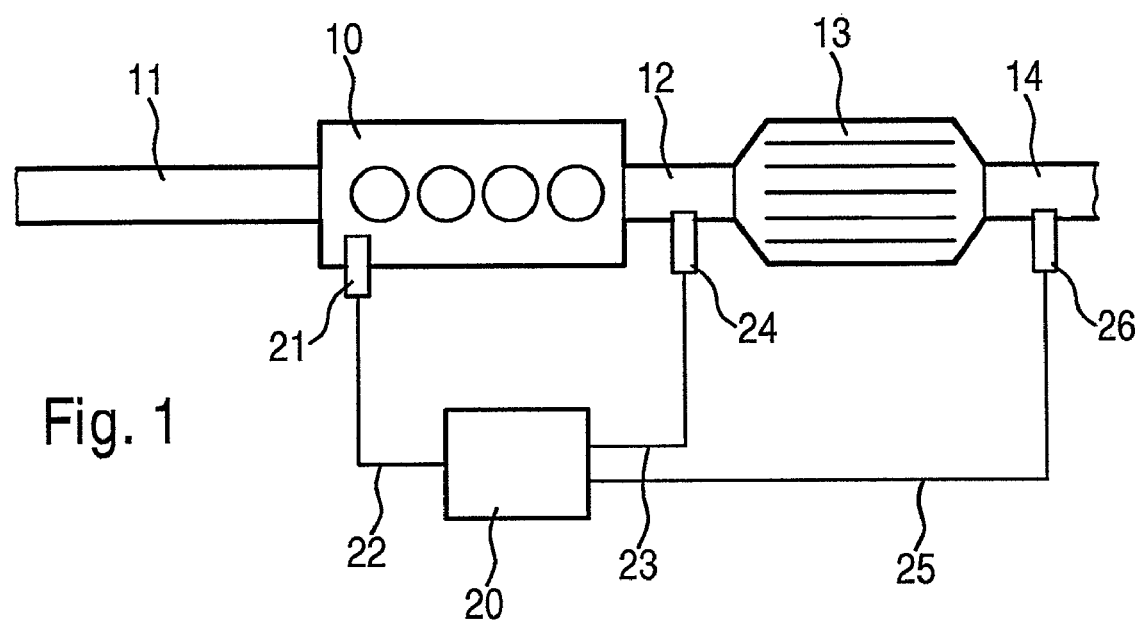
FIG. 1 shows a combustion engine with an emission control system.

FIG. 1 schematically shows a combustion engine 10 with a storage catalyst 13 and an engine control unit 20, which controls the operating parameters of the combustion engine 10. The combustion engine 10 is supplied with combustion air over a suction tube 11. The exhaust gas is added over the exhaust gas system 12 from the combustion engine 10 of an emission control system into a storage catalyst 13, whereby the oxygen content of the exhaust gas is measured by a linear exhaust gas probe 24 and the data is added to the engine control unit 20 by a first output signal cable 23. The engine control unit 20 determines the required fuel amount that has to be added and controls it over a signal cable 22 and fuel metering device 21. The storage catalyst 13 has a limited storage capacity and has to be regenerated if it is reached. This can be done inner power-operated by an additional fuel injection over the fuel metering device 21 or by the addition of a reduction agent in the exhaust gas system 12.

To control the functioning of the emission control system and to determine the average of reduction agent and therefore to terminate the regeneration cycle, a second exhaust gas probe 26 is arranged after the storage catalyst 13 in a second exhaust gas system 14, whose output signal is added also to the engine control unit 20 over a second output signal cable 25.

Figure 2:
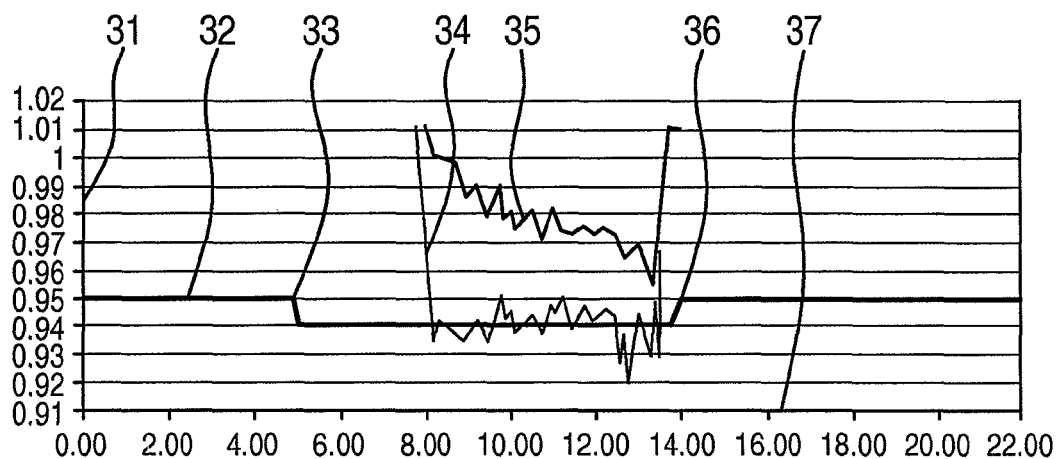
FIG. 2 is a signal progress of the output signals of the exhaust gas probes as well as the lambda nominal value.

FIG. 2 shows the progress of a first output signal 34 of the first exhaust gas probe 24, a second output signal 25 of the second exhaust gas probe 26 as well as a lambda nominal value 32 positioned at the first exhaust gas probe 24 depending on the time axis 37 on a lambda axis 31. A beginning of the regeneration 33 is here shown at a first point of time, at which the storage capacity of the storage catalyst 13 is depleted. In order to undertake the regeneration, the lambda nominal value 32 is set from the beginning of the regeneration 33 to the value of 0.94. The first output signal 34 of the first exhaust gas probe 24 follows with a certain time delay of the changing of the lambda nominal value 32. The second output signal 35 of the second exhaust gas probe 26 shows by a decrease of the lambda value, that reduction agent progressively occurs after the storage catalyst 13 during the regeneration phase. A termination of the regeneration 36 is thereby induced, that the lambda nominal value 32 is increased to the value before the regeneration phase.

Figure 3:
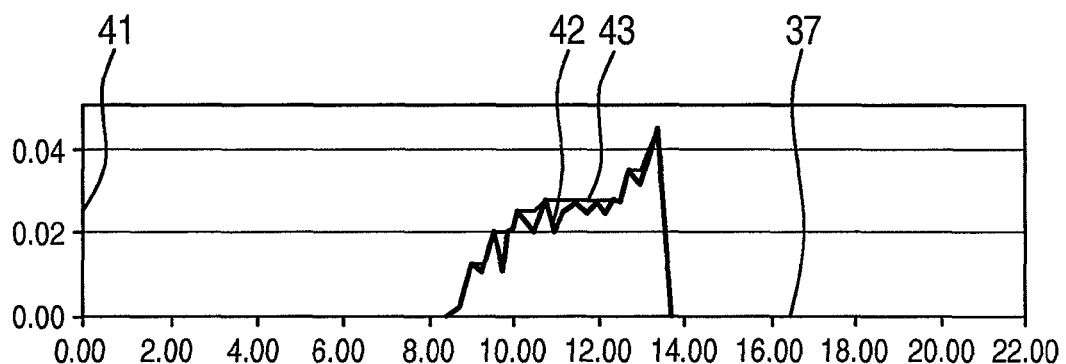
FIG. 3 shows the correction signal as well as the filtered correction signal.

In FIG. 3 a correction signal 42 as well as a filtered correction signal 43 is shown along the time axis 37 on a correction signal axis. The correction signal 42 is determined from the deviation of the second output signal 35, which is not shown here, from a lambda value of "one". The filtered correction signal 43 is determined from the correction signal 42, by changes of the correction signal 42 to a higher lambda value, as long as the filtered correction signal 43 stays below a lambda value of "one".

Figure 4:
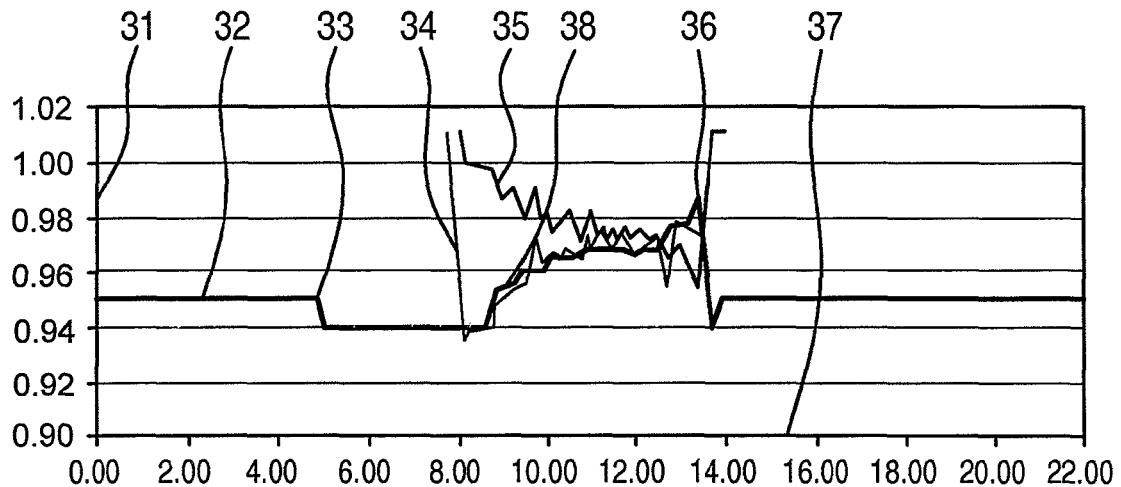
FIG. 4 shows the effect of the correction according to the invention

FIG. 4 shows the effect of the correction on the lambda nominal value 32 according to the invention. After the beginning of the regeneration 33 the second output signal 35 shows a sinking of the lambda value. The filtered correction signal 43, which is displayed in FIG. 3, is added to the lambda nominal value 32 and a corrected lambda nominal value 38 is created. Its progress is followed by the first output signal 34. Comparing this to FIG. 2, it can be noticed, that due to the invented correction, the second output signal 35 takes in a lower deviation from a lambda value of "one" and thereby a lower average of reduction agent takes place than in the implementation of FIG. 1. If the filtered correction signal 43 is preset and thereby also the corrected lambda nominal value 38, it can be assumed, that the regeneration phase can be terminated and the termination of the regeneration 36 is initiated.

The invention claimed is:

1. An engine control unit, for regenerating an emission control system of a combustion engine with a storage catalyst, wherein the engine control unit is configured to:
   receive a first output signal from a first exhaust gas probe arranged before the storage catalyst;
   receive a second output signal from a second exhaust gas probe arranged after the storage catalyst;
   regenerate the storage catalyst by an admission flow with a reduction agent in a regeneration phase during an adjustment of a lambda set point;
   monitor an amount of the reduction agent during the regeneration phase of the storage catalyst, wherein the amount of reduction agent is acquired by the second output signal; and
   create a correction signal out of a difference of a lambda value equal to one and the second output signal of the second exhaust gas probe, wherein the correction signal is added to the lambda set point to create a corrected lambda set point.

2. A device for regenerating an emission control system of a combustion engine with a storage catalyst, the device comprising:
   a first exhaust gas probe is arranged in an exhaust gas system before the storage catalyst;
   a second exhaust gas probe arranged in a second exhaust gas system after the storage catalyst;
   an engine control unit configured to:
      receive a first output signal from the first exhaust gas probe;
      receive a second output signal from the second exhaust gas probe;
      use the second output signal of the second exhaust gas probe as a disturbance variable for a lambda set point;
      regenerate the storage catalyst by an admission flow with a reduction agent in a regeneration phase during an adjustment of a lambda set point;
      monitor an amount of the reduction agent during the regeneration phase of the storage catalyst, wherein the amount of reduction agent is acquired by the second output signal; and
      create a correction signal out of a difference of a lambda value equal to one and the second output signal of the second exhaust gas probe, wherein the correction signal is added to the lambda set point to create a corrected lambda set point.

3. A method of regenerating an emission control system of a combustion engine with a storage catalyst, whereby a first exhaust gas probe is arranged in a first exhaust gas system before a storage catalyst and a second exhaust gas probe in a second exhaust gas system after the storage catalyst, the method comprising:
   forwarding a first output signal of the first exhaust gas probe and a second output signal of the second exhaust gas probe to an engine control unit;
   regenerating the storage catalyst by an admission flow with a reduction agent in a regeneration phase during an adjustment of a lambda set point;
   monitoring an amount of the reduction agent by the engine control unit during the regeneration phase of the storage catalyst, wherein the amount of reduction agent is acquired by the engine control unit by the second output signal of the second exhaust gas probe; and
   creating a correction signal out of a difference of a lambda value equal to one and the second output signal of the second exhaust gas probe, wherein the correction signal is added to the lambda set point to create a corrected lambda set point.

4. A method according to claim 3, wherein an addition of reduction agent occurs until the second output signal of the second exhaust gas probe corresponds with a lambda signal corresponding to the first output signal of the first exhaust gas probe.

5. A method according to claim 3, further comprising using the second output signal of the second exhaust gas probe as a disturbance variable for the lambda set point.

6. A method according to claims 3, wherein the correction of the lambda set point is undertaken only during a regeneration phase.

7. A method according to claim 3, wherein the correction of the lambda set point is undertaken only if the lambda set point is corrected in the direction of higher lambda values below a lambda value equal to one.

8. A method according to claim 3, further comprising terminating the regeneration phase at a specific level of the correction signal or at a specific level of a filtered correction signal.

* * * * *